United States Patent [19]
Yanagawa

[11] Patent Number: 6,050,142
[45] Date of Patent: Apr. 18, 2000

[54] YARN TENSION DETECTING APPARATUS

[75] Inventor: Makoto Yanagawa, Daitou, Japan

[73] Assignee: Murata Kikai Kabushiki Kaisha, Kyoto

[21] Appl. No.: 09/157,385

[22] Filed: Sep. 21, 1998

[30] Foreign Application Priority Data

Oct. 6, 1997 [JP] Japan ..................................... 9-289143

[51] Int. Cl.[7] ...................................................... G01L 5/04
[52] U.S. Cl. ........................... 73/159; 73/826; 73/862.391
[58] Field of Search ............................... 73/159, 160, 826, 73/827, 828, 862.381, 862.46, 862.471, 862.473, 862.474, 862.391

[56] References Cited

U.S. PATENT DOCUMENTS

| 2,380,433 | 9/1945 | Hattan | 73/862.46 |
|---|---|---|---|
| 2,538,932 | 1/1951 | Campbell | 73/862.46 |
| 3,613,065 | 10/1971 | Lindemann et al. | 340/668 |
| 3,679,808 | 7/1972 | Rohner et al. | 73/862.46 |
| 4,306,231 | 12/1981 | Bagnall et al. | 340/668 |

FOREIGN PATENT DOCUMENTS 59-198332  11/1984  Japan .

*Primary Examiner*—Max Noori
*Attorney, Agent, or Firm*—Armstrong, Westerman, Hattori, McLeland and Naughton

[57] ABSTRACT

To enable accurate yarn tension measurement by the elastic substrate in a yarn tension detecting apparatus including an elastic substrate 3, a yarn guide support 4 attached to the elastic substrate 3 approximately perpendicularly, a yarn guide 7 fixed at a free end of the yarn guide support 4, a strain measuring member 8 for measuring strain in the elastic substrate 3, and a resistor 9 that corrects effect of the temperature of the elastic substrate 3 from having a biased temperature distribution, a synthetic resin spacer 5 is interposed between the yarn guide 7 and the yarn guide support 4 and fixed thereto by a synthetic resin fixing member.

8 Claims, 3 Drawing Sheets

YARN TENSION DETECTING APPARATUS

FIELD OF THE INVENTION

The present Invention relates to an apparatus for measuring the tension of travelling yarn (hereafter simply referred to as "yarn") in various textile machines.

BACKGROUND OF THE INVENTION

A known yarn tension detecting apparatus is shown in FIG. 3. This yarn tension detecting apparatus comprises a ceramic yarn guide 7, an aluminum yarn guide support 4 to which the yarn guide 7 is directly fixed, an elastic substrate 3 to which the yarn guide support 4 is attached approximately perpendicularly and that is cantilever-supported by a housing 1, a strain measuring member 8 for measuring the strain in the elastic substrate 3 and a resistor 9 that corrects the effect of the temperature of the elastic substrate 3.

This yarn tension detecting apparatus uses the correcting resistor 9 to correct the effect of the temperature of the elastic substrate 3. Since, however, the yarn guide support 4 is composed of aluminum and a fixing screw 6 for the yarn guide 7 is composed of steel, a large amount of heat generated by the friction between the measured yarn Y and the yarn guide 7 is transmitted to the elastic substrate 3 via the yarn guide support 4. Thus, the elastic substrate 3, particularly its yarn guide support mounting position (axis position), becomes hot as shown by the continuous line in FIG. 2. As shown in this graph, the temperature of the position at which the strain measuring member 8 is located does not become so high because heat escapes from the supporting section to the housing 1, whereas the temperature of the position at which the correcting resistor 9 is located becomes very high. Thus, the correcting resistor 9 does not fulfill its inherent correcting function, which means that the yarn tension detecting apparatus is prevented from measuring the yarn tension accurately. This is pronounced when the measured yarn Y is travelling at a high speed.

It is an object of the present invention to prevent an elastic substrate of a yarn tension detecting apparatus from having a biased temperature distribution in order to enable accurate yarn tension measurements.

SUMMARY OF THE INVENTION

A yarn tension detecting apparatus according to the present invention comprises an elastic substrate 3, a yarn guide support 4 attached to the elastic substrate 3 approximately perpendicularly, a yarn guide 7 fixed at a free end of the yarn guide support 4, a strain measuring member for measuring strain in the elastic substrate 3 and a resistor 9 for correcting the effect of the temperature of the elastic substrate 3. A synthetic resin spacer 5 is interposed between the yarn guide 7 and the yarn guide support 4 (See FIG. 1).

The yarn guide 7 is fixed to the yarn guide support 4 using a synthetic resin fixing material 6 that penetrates the yarn guide 7 to reach the yarn guide support 4.

The elastic substrate 3 is cantilever-supported by a housing 1.

DETAILED DESCRIPTION OF THE PREFERRED EMBODIMENTS

Figure 1:
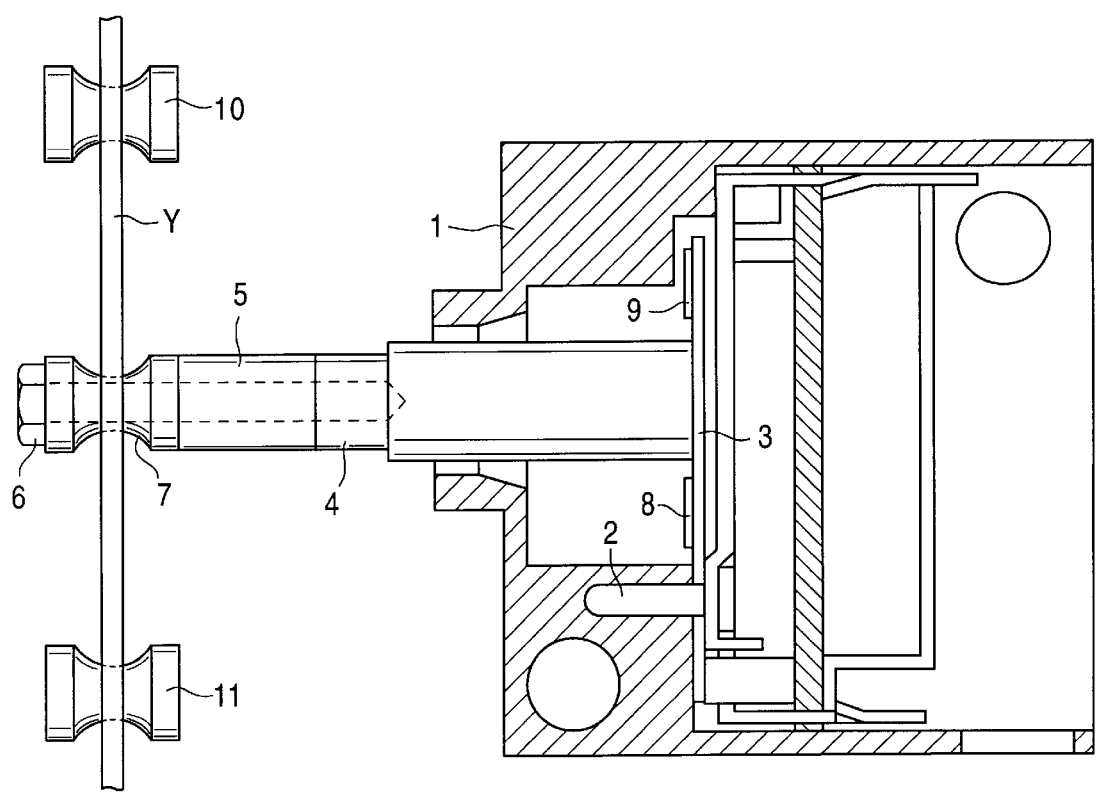
FIG. 1 is a sectional view of a yarn tension detecting apparatus according to the present invention.
Figure 2:
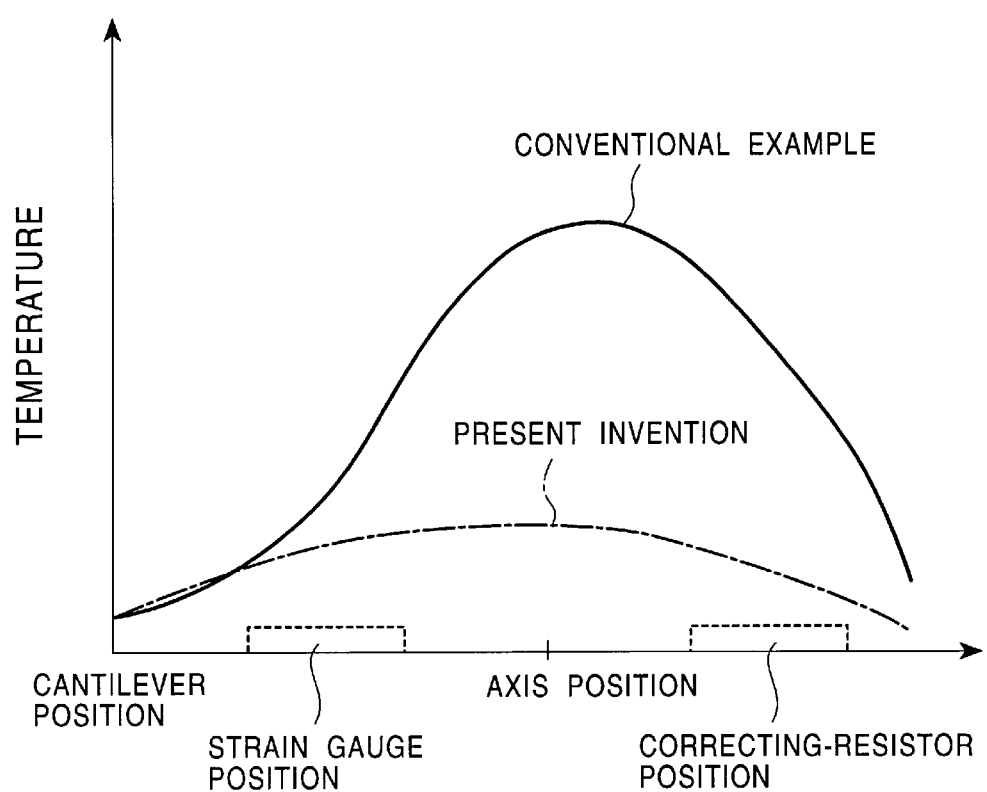
FIG. 2 is a graph showing a temperature distribution of an elastic substrate in the yarn tension detecting apparatus.
Figure 3:
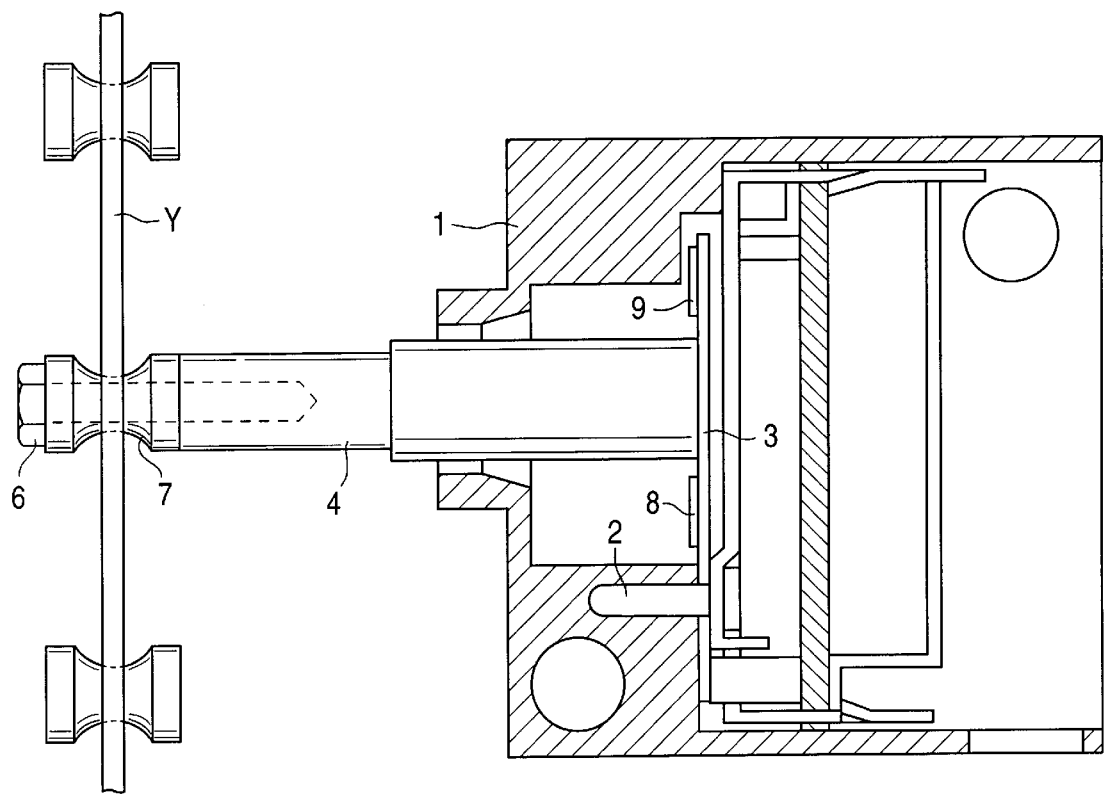
FIG. 3 is a sectional view of a conventional yarn tension detecting apparatus.

An embodiment of a yarn tension detecting apparatus according to the present invention is described with reference to FIGS. 1 and 2.

This yarn tension detecting apparatus is, for example, located at the rear of a heater in order to detect the untwisting tension of a draw texturing machine, and is composed of an elastic substrate 3 cantilever-supported by a screw 2 in a housing 1, a yarn guide support 4 protruding from the housing 1, a yarn guide 7 fixed by a fixing member 6 to a free end side of the yarn guide support 4 via a spacer 5, a strain measuring member 8 mounted on the elastic substrate 3 and a correcting resistor 9 mounted an the elastic substrate 3.

The spacer 5 of synthetic resin my be integrated with the yarn guide support 4, but by using the fixing member 6 to enable the spacer 5 to be detachably arranged easily to the yarn guide support 4, the spacer 5 of an optimal length can be used depending on the operational conditions. For example, changing the length of the spacer 5 changes the distance between the elastic substrate 3 and the yarn guide 7, and thus sensitivity that indicates the relationship between the displacement of the yarn guide 7 and the flexure of the elastic substrate 3.

The elastic substrate 3 is in the form of a long strip and must be resilient. According to this embodiment, the elastic substrate 3 is cantilever-supported by the screw 2 in the aluminum housing 1, but may be supported at both ends by attaching them to the housing 1. The former structure, however, can detect strain (flexure) in the elastic substrate 3 more easily, thereby enabling more accurate yarn tension measurements.

The yarn guide support 4, which transmits the displacement of the yarn guide 7 to the elastic substrate 3, is composed of aluminum.

The fixing member 6 is a screw made of synthetic resin that penetrates the yarn guide 7 and the spacer 5 to reach the yarn guide support 4, thereby allowing the yarn guide 7 to be fixed to the yarn guide support 4.

Although the spacer 5 and the fixing member 6 are both composed of a synthetic resin (a heat-insulating material) having a low thermal conductivity, the fixing member 6 contains 50% glass fiber for reinforcement. The thermal conductivity (unit: Kcal/m·hr·° C.) of the synthetic resin without glass fiber is 0.4, Whereas the thermal conductivity of the synthetic resin containing 50% glass fiber is 0.47. The thermal conductivities of steel and alumina are 50 and 21.6, respectively.

The yarn guide 7 is a member that is in contact with the travelling yarn Y, that is, a deader that detects tension, and is composed of ceramic mainly composing of alumina. During actual tension measurements, the yarn guide 7 is located between yarn guides 10 and 11 installed in a textile machine for which tension is measured, and the yarn Y is bent at an acute angle at the position of the yarn guide 7.

The strain measuring member 8, which measures flexure (strain) in the elastic substrate 3, is an element (strain gauge) that detects strain In a metal or semiconductor resistor, as a change in the resistance value. The strain measuring member 8 is located between the yarn guide support 4 on the elastic substrate 3 and a supporting section of the elastic substrate 3.

The correcting resistor 9 is an element used to correct the effect of the temperature of the elastic substrate 3 on the output of the strain measuring member, and to detect heat generated in a metal or semiconductor resistor, as a change in the resistance value. The correcting resistor 9 is located on the surface of the elastic substrate 3 on the opposite side of the strain measuring member 8 to the yarn guide support 4.

In a yarn tension detecting apparatus of the present configuration, the tension induced when the measured yarn Y travels while being bent at the yarn guide 7 is transmitted from the yarn guide support 4 to the elastic substrate 3 as the displacement of the yarn guide 7, and the flexure (strain) is detected by the strain measuring member 8 as a change in resistance. At the same time, the correcting resistor 9 corrects the effects of the temperature, thereby enabling the yarn tension to be measured. In this case, heat generated by the friction between the yarn Y and the yarn guide 7 is blocked by the spacer 5 and the fixing member 6 made of synthetic resin having a low thermal conductivity, and only a small amount of heat is transmitted from the yarn guide support 4 to the elastic substrate 3. The increase in the temperature of the elastic substrate 3 is therefore small. Thus, as shown by the chain line in FIG. 2, the temperature distribution of the elastic substrate 3 is almost uniform, in contrast to that achieved by conventional techniques (the continuous line). That is, the difference in temperature between the positions of the correcting resistor 9 and the strain measuring member 8 is almost negligible. Consequently, this apparatus measures the resistance value that must be modified by means of the correcting resistor 9, thereby enabling reliable measuring accuracy to be maintained. Even when the measured yarn Y is travelling at a high speed, only a small amount of heat is transmitted to the elastic substrate 3, which means that tension can be measured accurately.

Since tension can be measured accurately in this manner, if the yarn tension detecting apparatus Is used, for example, to detect the untwisting tension in a draw texturing machine, synthetic filament packages with stable yarn quality cam be formed by controlling the conditions of the draw texturing machine in accordance with the detected tension.

Due to the above configuration, the present invention provides the effects described below.

Even if the tension of yarn travelling at a high speed is measured, almost no frictional heat generated between the measured yarn and the yarn guide is transmitted to the elastic substrate. The effect of heat on the strain measuring member and other elements on the elastic substrate is therefore suppressed. In particular, the elastic substrate is cantilever-supported to allow the strain measuring member to be mounted between the supporting section and the yarn guide support, thereby enabling strain in the elastic substrate to be detected more easily to enable more accurate tension measurements.

Thus, even if the elastic substrate is cantilever-supported, there will be almost no difference in temperature between the positions of the strain measuring member and the correcting resistor on the opposite side of the strain measuring member to the yarn guide support. As a result, the tension can be measured very accurately.

In addition, the correcting resistor is mounted on the elastic substrate on the opposite side of the strain measuring member to the yarn guide support, thereby allowing the elastic substrate to be made smaller than the correcting resistor and strain measuring member mounted on the one side of the elastic substrate to the yarn guide support.

In addition, since the housing that cantilever-supports the elastic substrate is composed of aluminum, heat in the elastic substrate is released efficiently via the housing.

What is claimed is:

1. A yarn tension detecting apparatus including an elastic substrate, a yarn guide support attached to the elastic substrate approximately perpendicularly, a yarn guide fixed at a free end of the yarn guide support, and a strain measuring member for measuring strain in the elastic substrate, means for fixing said yarn guide to said yarn guide support comprising a spacer formed of a heat insulating material interposed, and detachably connected between, the yarn guide and the yarn guide support.

2. A yarn tension detecting apparatus according to claim 1 in which the yarn guide is fixed to the yarn guide support using a detachable fixing member formed of synthetic resin that penetrates the yarn guide to connect with the yarn guide support.

3. A yarn tension detecting apparatus according to claim 2 in which the synthetic resin fixing member penetrates the synthetic resin spacer to connect with the yarn guide support.

4. A yarn tension detecting apparatus according to any one of claims 1, 2 or 3 in which the elastic substrate is cantilever-supported by a housing.

5. A yarn tension detecting apparatus according to claim 4 in which the housing is composed of aluminum.

6. A yarn tension detecting apparatus according to any one of claims 1, 2, 3 or 5 in which a correcting resistor is provided on the elastic substrate to correct the effect of the temperature of the elastic substrate on the output of the strain measuring member.

7. A yarn tension detecting apparatus according to claim 6 in which the correcting resistor is mounted on the elastic substrate on the opposite side of the strain measuring member to the yarn guide support.

8. A yarn tension detecting apparatus according to claim 7 in which where the elastic substrate is cantilever-supported by the housing, the strain measuring member is mounted between a supporting section of the elastic substrate and the yarn guide support, and the correcting resistor is mounted on the elastic substrate on the opposite side of the supporting section of the elastic substrate to the yarn guide support.

* * * * *